United States Patent [19]

Sorkin

[11] 4,003,844
[45] Jan. 18, 1977

[54] LIQUID CRYSTAL DEVICES

[75] Inventor: Howard Sorkin, Berkeley Heights, N.J.

[73] Assignee: RCA Corporation, New York, N.Y.

[22] Filed: Nov. 17, 1975

[21] Appl. No.: 632,815

[52] U.S. Cl. ............................ 252/299; 350/160 LC
[51] Int. Cl.² ..................... C09K 3/34; G02F 1/13
[58] Field of Search ............... 252/299, 408 LC; 350/160 LC, 150

[56] References Cited

UNITED STATES PATENTS

| 3,815,972 | 6/1974 | Hsieh | 252/299 |
| 3,915,883 | 10/1975 | van Meter et al. | 252/299 |
| 3,947,375 | 3/1976 | Gray et al. | 252/299 |

FOREIGN PATENTS OR APPLICATIONS

| 807,165 | 3/1974 | Belgium | 252/299 |
| 2,321,632 | 11/1974 | Germany | 252/299 |
| 49-38888 | 4/1974 | Japan | 252/299 |
| 49-13082 | 12/1974 | Japan | 252/299 |
| 49-34488 | 3/1974 | Japan | 252/299 |

OTHER PUBLICATIONS

Elliott, G., et al., Electronics Letters, vol. 9, No. 17, pp. 399–401 (8/73).

*Primary Examiner*—Benjamin R. Padgett
*Assistant Examiner*—T. S. Gron
*Attorney, Agent, or Firm*—Glenn H. Bruestle; Birgit E. Morris

[57] ABSTRACT

The addition of certain nitrobenzene compounds to liquid crystal compositions having positive dielectric anisotropy, lowers the threshold voltage of electro-optic cells including such compositions. The nitrobenzene compounds have the formula

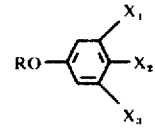

wherein R is an alkyl group of 1–20 carbon atoms, $X_1$ and $X_3$ can be hydrogen or nitro and $X_2$ can be hydrogen, $-NO_2$,

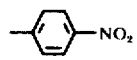

or $-O-CH_2CN$, with the proviso that at least one of $X_1$, $X_2$ or $X_3$ is a radical other than hydrogen.

16 Claims, 1 Drawing Figure

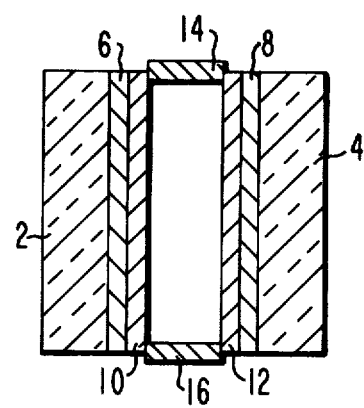

LIQUID CRYSTAL DEVICES

This invention relates to novel electro-optic devices. More particularly, this invention relates to field effect liquid crystal devices having low threshold voltages.

BACKGROUND OF THE INVENTION

Liquid crystal devices are of increasing interest for electrically controllable displays. The discovery of liquid crystals which operate at room temperatures has encouraged an ever-expanding market for liquid crystal cells for watch displays, calculator displays, various automotive dial displays and the like. Liquid crystal cells operate either in a dynamic scattering mode or in a field effect mode.

One type of field effect cells are those characterized as twisted nematic liquid crystal cells. These cells derive their name from the initial ordering of the liquid crystal material, which has a twist of 90° in alignment of the molecules throughout the cells. These cells employ liquid crystals or mixtures of liquid crystals which have positive dielectric anisotropy, i.e., the magnitude of the dielectric constant in a direction parallel to the long axis of the molecular chain is greater that the magnitude of the dielectric constant in a direction perpendicular to the long axis of the molecular chain. When an electric field is applied to the cell, the molecules of liquid crystal reorient themselves, thereby changing the passage of light through the cell as viewed through crossed polarizers. When the electric field is removed, the liquid crystal material reverts to its original alignment. The amount of voltage required to initiate the "untwisting" of the material of the cell is called the threshold voltage, and is inversely related to the anisotropy of the composition.

Electro-optic devices made from these twisted nematic liquid crystal materials have several stringent requirements for use in watches they should have a use temperature range of from about −10° to 60° C. or broader; the response time should be 250 milliseconds or less; and the threshold voltage should be less than 2 volts, and preferably less than 1 volt. Generally, devices of this type are operated at 2.5 to 3 times the threshold voltage in order to obtain good visual contrast in the display. Since electronic watches generally operate on a 1.5 volt battery, and liquid crystal materials which have a threshold voltage of less than 1.0 are very rare, some means of doubling or even tripling the voltage of the battery must be provided. This of course adds to the expense of watch manufacture. This expense would be avoided if liquid crystal materials were available to meet all of the other requirements for good field effect twisted nematic liquid crystal cells and in addition have lower threshold voltage.

SUMMARY OF THE INVENTION

I have found that the addition of certain highly polar nitrobenzene compounds which are not liquid crystalline but which are soluble in the twisted nematic liquid crystal employed, reduces the threshold voltage of the liquid crystal material. These polar compounds become aligned by the liquid crystal material and increase the dielectric anisotropy, thereby lowering the threshold voltage.

BRIEF DESCRIPTION OF THE DRAWING

The FIGURE is a cross-sectional view of an electro-optic device embodying the invention.

DETAILED DESCRIPTION OF THE INVENTION

Suitable highly polar compounds useful as additives for liquid crystal compositions to lower the threshold voltage include compounds of the formula

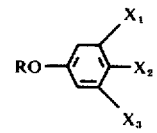

wherein R is an alkyl group of 1–20 carbon atoms, $X_1$ and $X_3$ can be hydrogen or nitro and $X_2$ can be hydrogen, $-NO_2$,

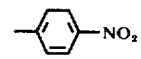

or $-O-CH_2CN$, with the proviso that at least one of $X_1-X_3$ is a radical other than hydrogen. P-nitroanisole is readily available and is presently preferred.

The above additives are dissolved in liquid crystal compositions useful in twisted nematic field effect devices. Such compositions include for example mixtures of p-methoxybenzylidene-p'-n-butylaniline (hereinafter referred to as MBBA) and p-ethoxybenzylidene-p'-n-butylaniline (hereinafter referred to as EBBA) with a positive dielectric liquid crystal compound of the formula

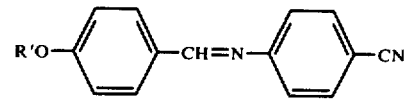

wherein R' is an alkyl group of 1–7 carbon atoms. Such mixtures are disclosed in copending application of Levine, Ser. No. 528,903, filed Dec. 2, 1974. Other examples are mixtures of Schiff bases of the formula

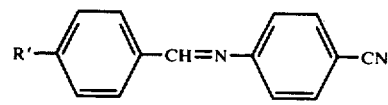

wherein R' has the meaning given above; and mixtures of MBBA, EBBA, a

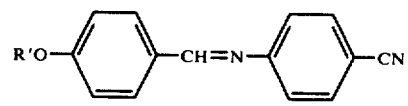

compound as defined above and 4-pentylphenyl-2-chloro-4-(4'-n-pentylbenzoyloxy)- benzoate which is described in my copending application Ser. No. 615,849, filed Sept. 23, 1975.

Minor amounts of from about 1 to about 15 percent by weight of a nitrobenzene compound described above, based on the weight of the twisted nematic liquid crystal composition to which it is added, are effective to substantially reduce the threshold voltage of the liquid crystal mixture. Since the addition of the nitrobenzene compound also substantially reduces the operating use temperature range of the liquid crystal mixture, the exact amount to be added depends on the requirements for the particular application.

In preparing an electro-optic device, the liquid crystal compound should be rigorously purified to remove ionic and nonionic impurities which may react to degrade the liquid crystal compound, such as by decomposition and the like. For commercially acceptable liquid crystal cells, the liquid crystal compound should be purified to a resistivity of at least $1 \times 10^{11}$ ohm-cm.

After the liquid crystal compounds are mixed together, a small amount of a chiral aligning agent may be advantageously added. The aligning agent serves to orient the molecules of the mixture in the same direction, since chiral compounds normally twist in a right-handed or left-handed direction. Suitable aligning agents include cholesteryl derivatives, such as cholesteryl halides, cholesteryl esters and the like and optically active compounds such as d- or l-alphapinene, d- or l-octanol and chiral esters such as 4-propylphenyl-4'-(4''-2-methylbutylphenylcarboxy)-2-chlorobenzoate and the like. The amount of the chiral aligning agent added is not critical providing the pitch of the liquid crystal mixture is not too small. In general, a suitable amount of the aligning agent ranges from about 0.05 to about 2% by weight of the liquid crystal composition.

The invention will be further illustrated by the following examples but is is to be understood that the invention is not meant to be limited to the details disclosed therein. In the examples, parts and percentages are by weight. The clearing point was determined on a hot stage heater.

EXAMPLE 1-

To a mixture of 40.9 grams of MBBA, 40.9 grams of EBBA and 9.1 grams of p-n-butyoxybenzylidene-p'-cyanoaniline (hereinafter referred to as P-4) was added various amounts of p-nitroanisole.

The resultant mixture was charged to a standard electro-optic cell. Referring to the FIGURE a liquid crystal cell was constructed from two glass plates 2 and 4 having conductive indium-doped tin oxide coatings 6 and 8, respectively, on facing surfaces thereof. Thin silicon oxide layers 10 and 12 were evaporated onto the conductive layers 6 and 8, respectively, at angles of 60° and 84°. One-half mil thick glass spacers 14 and 16 join the coated glass plates 2 and 4 to complete the cell. The cell was sealed by baking at 525° C. and filled with the desired liquid crystal composition in the isotropic state.

The amounts of p-nitroanisole present, the liquid crystal to isotropic liquid transition temperature (NL), the melting point of the mixture (CN) and the threshold voltage ($V_{Th}$) of the cell are summarized below:

| p-nitroanisole, gms. | NL, ° C. | CN, ° C. | $V_{Th}$, volts |
| --- | --- | --- | --- |
| 0 | 65 | −13 | 2.5 |
| 5 | 48.4 | * | 1.27 |
| 10 | 36.2 | * | 1.03 |

*did not crystallize at −25° C.

EXAMPLE 2-

Para-nitroanisole was added to a liquid crystal mixture of p-propylbenzylidene-p'-cyanoaniline and p-hexylbenzylidene-p'-cyanoaniline and the data collected as in Example 1. The results are given below:

| p-nitroanisole, gms. | NL, ° C. | CN, ° C. | $V_{Th}$, volts |
| --- | --- | --- | --- |
| 0 | 64.5–65 | * | 1.0 |
| 5 | 51–52 | * | 0.85 |
| 10 | 38.8 | * | 0.68 |

*did not crystallize at −25° C.

EXAMPLE 3-

A liquid crystal mixture was prepared from the following: 20 grams of MBBA, 20 grams of EBBA, 40 grams of P-4 and 20 grams of PCPB. Para-nitroanisole was added and data collected as in Example 1. The results are given below:

| p-nitroanisole, gms. | NL, ° C. | CN, ° C. | $V_{Th}$, volts |
| --- | --- | --- | --- |
| 0 | 86.6 | (a) | 1.36 |
| 5 | 79.9 | (a) | 1.26 |
| 6 | 71.9 | (a) | 1.11 |

(a) no freezing point was observed during the following cooling cycle: 39 hours at 0° C.; 3 hours at −10° C.; 3 hours at −20° C.; 3 hours at −30° C.; 24 hours at −40° C.; 64 hours at −30° C.

EXAMPLE 4-

A liquid crystal mixture was prepared from the following: 33.3 grams of a mixture containing equal amounts by weight of MBBA and EBBA, 33.3 grams of -and 33.3 grams of PCPB. Para-nitroanisole was added and data collected as in Example 1. The results are given below:

| p-nitroanisole, gms. | NL, ° C. | CN, ° C. | $V_{Th}$, volts |
| --- | --- | --- | --- |
| 0 | 91.8 | (a) | 1.31 |
| 5 | 77.5 | (a) | 1.07 |
| 6 | 77.3 | (a) | 1.23 |

(a) see Example 3

Example 5-

A liquid crystal mixture was prepared from the following: 30 grams of a mixture containing equal amounts by weight of MBBA and EBBA, 40 grams of P-4 and 30 grams of PCPB. Para-nitroanisole was added and data collected as in Example 1. The results are given below:

| p-nitroanisole, gms. | NL, ° C. | CN, ° C. | $V_{Th}$, volts |
| --- | --- | --- | --- |
| 0 | 91.7 | (a) | 1.34 |
| 5 | 75.7 | (a) | 1.13 |
| 6 | 71.4 | (a) | 0.81 |

(a) see Example 3

EXAMPLE 6-

Various liquid crystal mixtures were prepared to which a 0.1% of cholesteryl nonanoate was added as an aligning agent. Para-nitroanisole was added and data collected as in Example 1. The results are given below:

| Liquid Crystal Mixture | p-nitroanisole, % by Weight | $N_L$, °C. | $V_{Th}$, volts |
| --- | --- | --- | --- |
| Example 3 | 0 | 87 | 1.5 |
| " | 15 | 54.8 | 0.8 |
| Example 4 | 0 | 90.5 | 1.4 |
| " | 15 | 47.1 | 0.7 |
| Example 5 | 0 | 91.7 | 1.4 |
| " | 15 | 35 | 0.7 |

EXAMPLE 7-

Para-nitroanisole was added to PCPB and data collected as in Example 1. The results are summarized below:

| PCPB, % by Weight | p-nitroanisole, % by Weight | $N_L$, °C. | CN, °C. | $V_{Th}$, volts |
| --- | --- | --- | --- | --- |
| 0.905 | 0.0985 | 91.3–94.2 | | 1.2 |
| 0.8 | 0.2 | 62 | 26–32 | 0.55 |

EXAMPLE 1.-

Para-octyloxy-p'-nitrobenzene was added to the liquid crystal composition of Example 1. Similar results were obtained.

I claim:

1. In an electro-optic device comprising a twisted nematic liquid crystal composition between two electrodes, the improvement which comprises dissolving in said liquid crystal composition a nitrobenzene compound having the formula

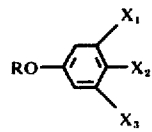

wherein R is an alkyl radical of 1–20 carbon atoms $X_1$ and $X_3$ independently can be hydrogen or nitro, $X_2$ can be hydrogen, nitro, or -O-CH$_2$CN with the proviso that at least one of $X_1$, $X_2$ or $X_3$ is a radical other than hydrogen, in an amount effective to lower the threshold voltage of said device.

2. A device according to claim 1 wherein R is methyl.

3. A device according to claim 1 wherein said nitrobenzene compound is p-nitroanisole.

4. A device according to claim 3 wherein said twisted nematic liquid crystal composition consists essentially of p-methoxybenzylidene-p'-n-butylaniline, p-ethoxybenzylidene-p'-n- butylaniline, and one or more members of the group having the formula

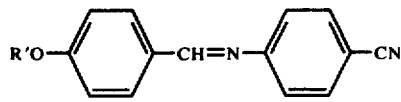

wherein R' is an alkyl group of from 1–7 carbon atoms, and an effective amount of a chiral aligning agent.

5. A device according to claim 3 wherein said liquid crystal mixture consists essentially of p-methoxybenzylidene-p'-n-butylaniline, p-ethoxybenzylidene-p'-n-butylaniline, one or more members of the group having the formula

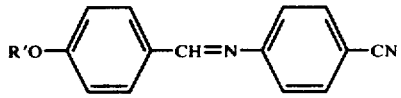

wherein R' is an alkyl group of from 1–7 carbon atoms, 4-n-pentylphenyl-2-chloro-4-(4'-n-pentylbenzoyloxy)-benzoate and a chiral aligning agent.

6. A liquid crystal composition comprising a nematic liquid crystal composition having positive dielectric anisotropy and a nitrobenzene compound of the formula

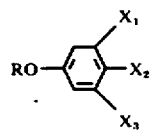

wherein R is an alkyl group of 1–20 carbon atoms, $X_1$ and $X_3$ independently can be hydrogen or nitro, $X_2$ can be hydrogen, nitro, or —O-CH$_2$CN with the proviso that at least one of $X_1$, $X_2$ or $X_3$ is a radical other than hydrogen.

7. A liquid crystal composition according to claim 6 wherein the nitrobenzene compound has the formula

wherein R is an alkyl group of 1–20 carbon atoms.

8. A liquid crystal composition according to claim 7 wherein said nitrobenzene compound is p-nitroanisole.

9. A liquid crystal composition according to claim 6 wherein said nematic liquid crystal composition having positive dielectric anisotropy consists essentially of p-methoxybenzylidene-p'-n-butylaniline, p-ethoxybenzylidene-p'-n-butylaniline and one or more members of the group having the formula

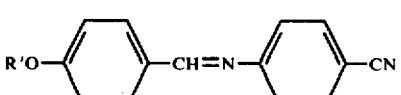

wherein R' is an alkyl group of from 1–7 carbon atoms.

10. A liquid crystal composition according to claim 9 additionally containing a chiral aligning agent.

11. A liquid crystal composition according to claim 10 wherein said aligning agent is cholesteryl nonanoate.

12. A liquid crystal composition according to claim 11 wherein said nitrobenzene compound is p-nitroanisole.

13. A liquid crystal composition according to claim 6 wherein said nematic liquid crystal composition having positive dielectric anisotropy comprises p-methoxybenzylidene-p'-butylaniline, p-ethoxybenzylidene-p'-n-butylaniline, one or more members of the group having the formula

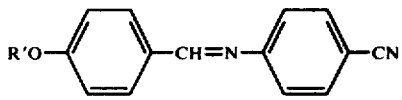

wherein R' is an alkyl group of 1–7 carbon atoms and from about 5 to about 50% by weight of the total mixture of 4-n-pentylphenyl-2-chloro-4-(4'-n-pentylbenzoyloxy)benzoate.

14. A liquid crystal composition according to claim 13 additionally containing a chiral aligning agent.

15. A liquid crystal composition according to claim 14 wherein the aligning agent is cholesteryl nonanoate.

16. A liquid crystal composition according to claim 14 wherein said nitrobenzene compound is p-nitroanilsole.

* * * * *